United States Patent
Kawano

(10) Patent No.: US 8,437,377 B2
(45) Date of Patent: May 7, 2013

(54) PULSE GENERATOR, TRANSMITTER-RECEIVER, AND PULSE GENERATION METHOD

(75) Inventor: Yoichi Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1082 days.

(21) Appl. No.: 12/330,906

(22) Filed: Dec. 9, 2008

(65) Prior Publication Data
US 2009/0154527 A1   Jun. 18, 2009

(30) Foreign Application Priority Data

Dec. 12, 2007   (JP) ................... 2007-321427

(51) Int. Cl.
*H04B 1/00*   (2006.01)
(52) U.S. Cl.
USPC ........... 375/130; 327/291; 348/312; 358/410; 377/96; 379/359; 379/362
(58) Field of Classification Search ........................ None
See application file for complete search history.

(56) References Cited

U.S. PATENT DOCUMENTS

| | | | |
|---|---|---|---|
| 3,714,653 A * | 1/1973 | Thor et al. | 342/201 |
| 6,888,393 B2 | 5/2005 | Naito | |
| 7,257,148 B2 | 8/2007 | Suzuki | |
| 7,289,576 B2 * | 10/2007 | Sanada | 375/296 |
| 2008/0019424 A1 * | 1/2008 | Green et al. | 375/146 |

FOREIGN PATENT DOCUMENTS

| | | |
|---|---|---|
| JP | 2002-335188 A | 11/2002 |
| JP | 2004-146974 A | 5/2004 |
| JP | 2006-115218 A | 4/2006 |

OTHER PUBLICATIONS

Partial English-language translation of Japanese Office Action mailed Nov. 22, 2011 for corresponding Japanese Application No. 2007-321427.

* cited by examiner

*Primary Examiner* — David C. Payne
*Assistant Examiner* — Adolf Dsouza
(74) *Attorney, Agent, or Firm* — Fujitsu Patent Center

(57) ABSTRACT

A pulse generator with a filter section limiting a band of an input signal, and a pulse generating section generating a plurality of pulses which are sequentially delayed one after another by a time period ($\tau$) substantially equal to a reciprocal of a center frequency of the band of the filter section, and inputting the plurality of pulses to the filter section.

34 Claims, 9 Drawing Sheets

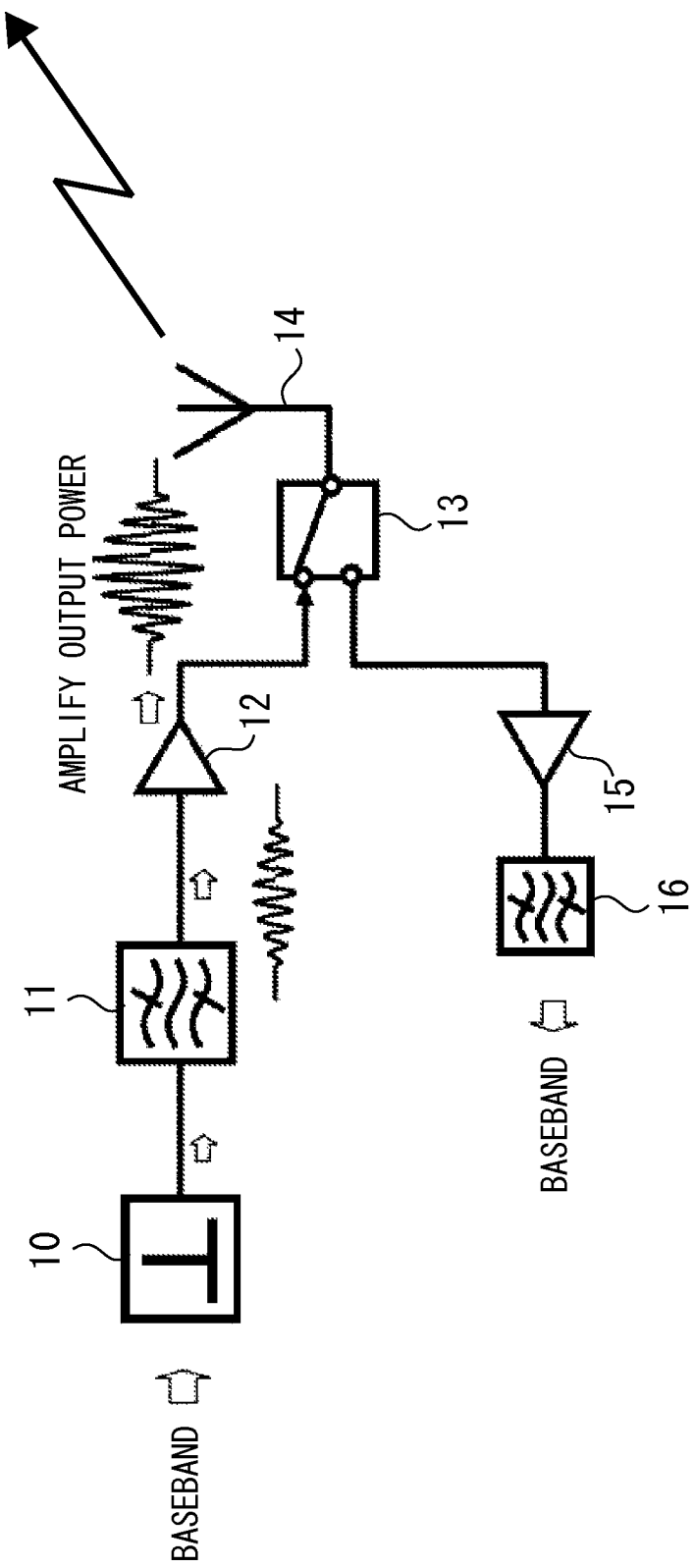

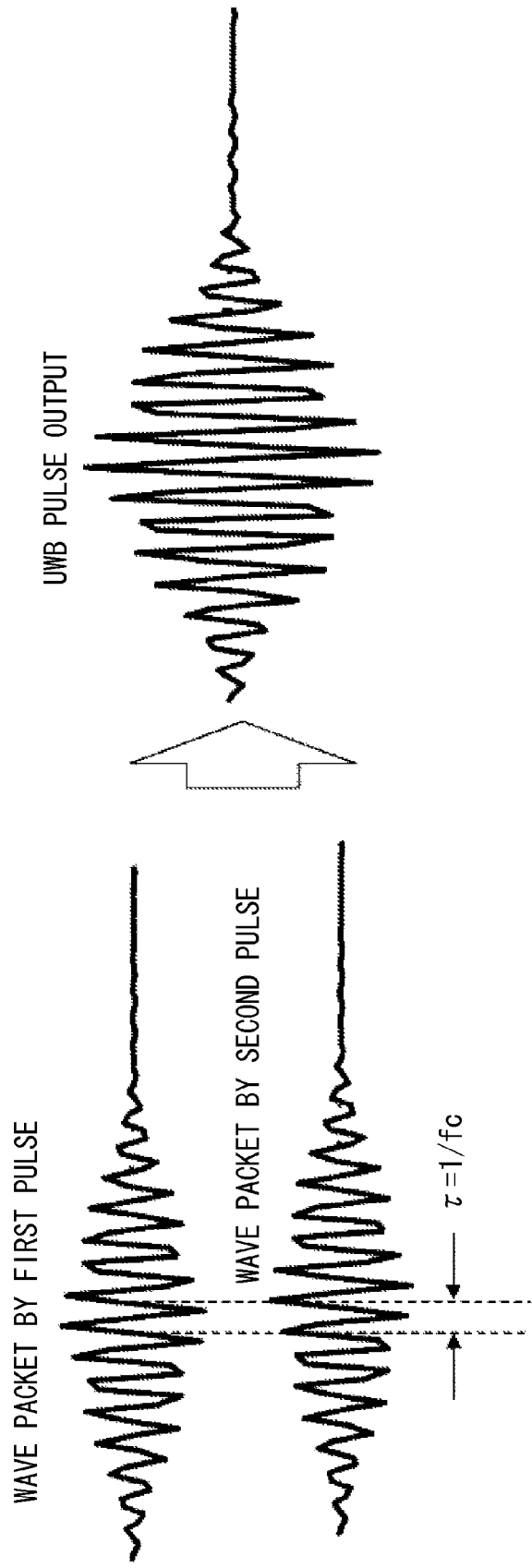

PULSE GENERATOR, TRANSMITTER-RECEIVER, AND PULSE GENERATION METHOD

CROSS-REFERENCE TO RELATED APPLICATIONS

This application is based upon and claims the benefit of priority from the prior Japanese Patent Application No. 2007-321427, filed on Dec. 12, 2007, the entire contents of which are incorporated herein by reference.

TECHNICAL FIELD

The present invention relates to a pulse generator, a transmitter-receiver, and a pulse generation method.

BACKGROUND

FIG. 1 is a block diagram of a transmitter-receiver using a conventional pulse generator. Here, a description will be given by taking a pulse generator used in an Ultra Wide Band (UWB) pulse system as an example.

A short pulse generator 10 generates a pulse having a narrow width from a baseband signal. The generated pulse is limited to a desired band by a band pass filter 11. After passing through the band pass filter 11, the pulse is amplified by an amplifier 12, so as to be made to pass through a switch 13, and is then transmitted from an antenna 14. Further, a signal received by the antenna 14 is made to pass through the switch 13, so as to be amplified by an amplifier 15. The amplified signal is made to pass through a band pass filter 16, and is then processed as a baseband signal.

FIGS. 2A and 2B are figures for explaining a conventional pulse generator.

FIG. 2A is a figure obtained by taking out only the pulse generator from the transmitter-receiver shown in FIG. 1. A single pulse is generated by the short pulse generator 10, and is then subjected to band limiting processing by the band pass filter 11, so that a single UWB pulse is generated. The band pass filter 11 cuts off a spectral portion having a center frequency of fc and having a band from f0 to f1, from the power spectrum of the pulse as shown in FIG. 2B. The UWB pulse is generated as a wave packet having a waveform shown on the right side in FIG. 2A. An amplitude of the waveform depends on an amplitude of the pulse outputted from the short pulse generator 10. The time interval between adjacent oscillation peaks in the wave packet is represented by $\tau$ equal to a reciprocal of the center frequency of the pass band of the band pass filter. That is, the wave packet oscillates at substantially the same frequency as the center frequency of the band pass filter.

The pulse generator includes the short pulse generator 10 and the band pass filter 11 (BPF) for allowing a signal of a desired UWB band to pass therethrough. The pulse ideally means a pulse having a pulse width infinitely close to zero and having a frequency spectrum extended, as shown in FIG. 2B, from a direct current to an ultra high frequency (to infinite frequency if the time width is zero). A UWB pulse having a desired frequency band can be obtained by inputting the pulse into a BPF designed so as to satisfy the UWB band spectrum mask. At this time, the UWB pulse is formed into a wave packet that oscillates at the center frequency fc of the BPF (the waveform of which is shown on the right side of FIG. 2A). An amplitude of the UWB pulse depends on a passage loss of the BPF, and the amplitude of the pulse outputted from the short pulse generator.

As shown in FIGS. 2A and 2B, a single UWB pulse is generated from a single pulse in the conventional technique. Thus, in order to amplify the amplitude of the single UWB pulse, it is necessary to increase the amplitude of the pulse itself. There are various methods for generating the pulse. However, for example, in the case where digital circuits (EXOR and AND circuits) are used, the preferred way is to increase the voltage of power source in order to increase the output amplitude of the pulse without deteriorating the pulse frequency characteristic (band). If a pulse having a doubled amplitude is to be outputted, it is simply necessary to double the power source voltage. This results in an increase in power consumption.

As a conventional technique, there is described in Japanese Patent Laid-Open No. 2004-146974 a method in which a synthesized waveform is generated by using a signal and its delay signal. There is also described in Japanese Patent Laid-Open No. 2002-335188 a technique in which a pulse inputted into an input of a band pass filter is made to pass through the band pass filter, so as to be formed into a wave packet.

In the conventional techniques, the pulse is made to pass through the filter, and hence the amplitude of the UWB pulse is reduced. Further, in order to obtain sufficient output power, it is necessary to increase the output amplitude of the pulse or to amplify the pulse by using an output amplifier. However, this results in an increase in power consumption.

SUMMARY

A pulse generator according to an aspect of the present invention includes a filter section limiting a band of an input signal, and a pulse generating section generating a plurality of pulses which are sequentially delayed one after another by a time period ($\tau$) equal to a reciprocal of a center frequency of the band of the filter section, and inputting the plurality of pulses to the filter section.

BRIEF DESCRIPTION OF THE DRAWINGS

FIG. 1 is a block diagram of a transmitter-receiver using a conventional UWB pulse generator;

FIG. 4 is a figure explaining the principle of the embodiment according to the present invention;

DETAILED DESCRIPTION OF THE EMBODIMENTS

In the conventional technique, in order to increase the amplitude of a transmission signal, there are adopted methods of dealing with the amplitude itself, such as a method of increasing a power source voltage and a method of using an amplifier. This results in a problem of increase in power consumption as described above. In the present embodiment, a train of pulses generated at given time intervals is synthesized. That is, a final amplitude of the UWB transmission pulse is increased by synthesizing the plurality of pulses.

Figure 2A:
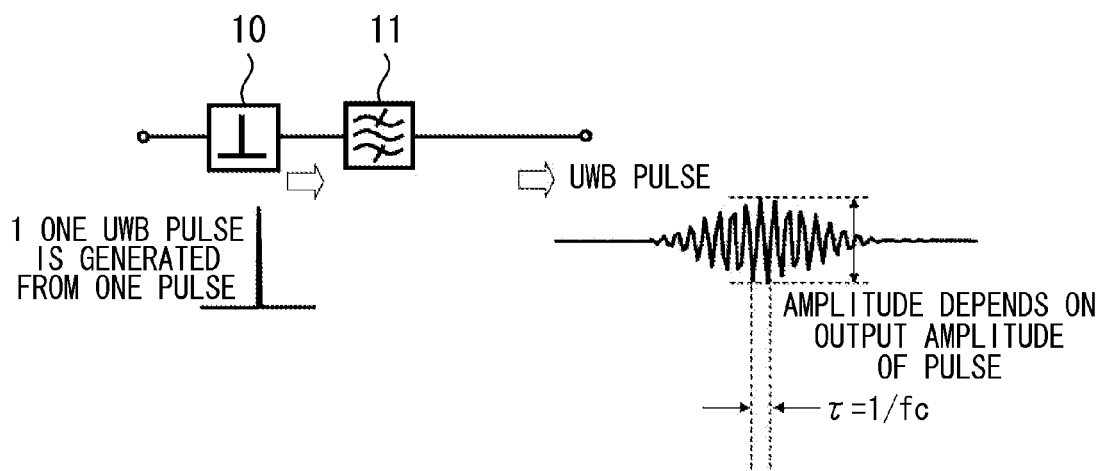
FIGS. 2A and 2B are figures explaining the conventional UWB pulse generator.
Figure 2B:
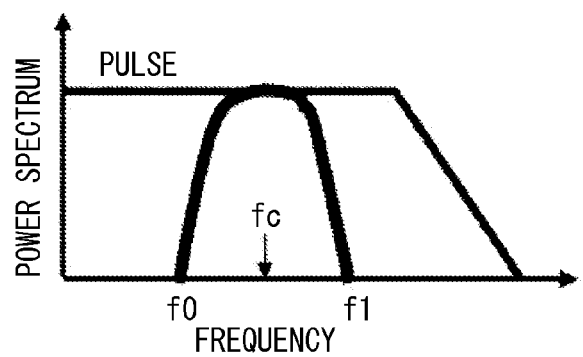
Figure 3A:
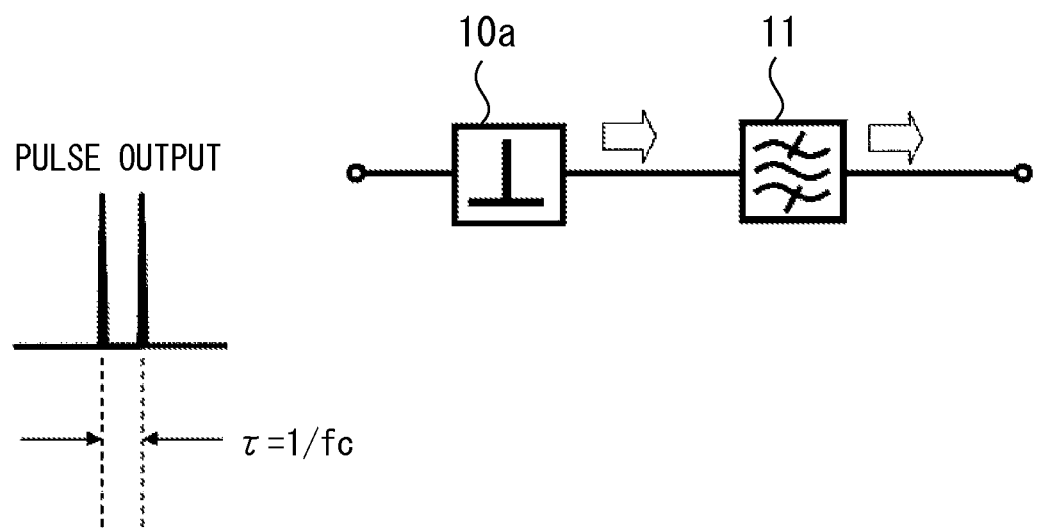
FIGS. 3A and 3B are figures showing a pulse generator according to an embodiment of the present invention.
Figure 3B:
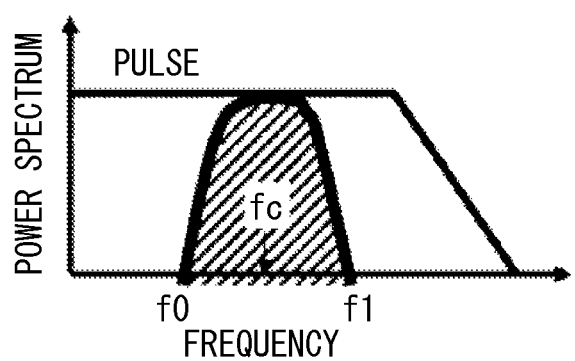

FIGS. 3A and 3B show a pulse generator according to an embodiment of the present invention.

The pulse generator includes a short pulse generator 10a and a band pass filter (BPF) 11. At this time, as an input of the BPF 11, a single pulse is not used as in the conventional technique, but two pulses are used, one of which is delayed from the other by a reciprocal (1/fc) of the center frequency of the BPF 11, (or a plurality of pulses sequentially delayed one after another by the reciprocal (1/fc) of the center frequency of the BPF 11). Thus, first, the first pulse is inputted into the BPF 11, so that a wave packet oscillating at the center frequency fc is generated (FIG. 3B). Then, a similar wave packet delayed by the time period (1/fc) from the first wave packet is generated (FIG. 4). At this time, the time period (1/fc) is substantially equal to the oscillation period of the wave packet, and hence, as shown in FIG. 4, the wave packets mutually shifted by the time period (1/fc) are mutually shifted by the time period substantially equal to the oscillation period of the wave packets. Thus, the peaks and bottoms of the first wave packet coincide with the peaks and bottoms of the second wave packet, respectively. Therefore, the two wave packets are mutually strengthened by a mutually strengthening interference in the BPF 11, so that the amplitude of the UWB pulse outputted from the BPF 11 is doubled (increased by 3 dB) as compared to the amplitude in the case where the UWB pulse is formed by a single pulse. Similarly, when four pulses, which are sequentially delayed one after another by the time period 1/fc, are used, it is possible to obtain a UWB pulse having an amplitude four times the amplitude obtained by the conventional technique. In this way, in the present embodiment, in order to increase the output power of a signal, the amplitude of a UWB pulse is not increased by a conventional method for performing processing in the amplitude direction (for increasing the amplitude by using an amplifier, or the like), but is increased by a method for performing processing in the time direction (for increasing the pulse density in a unit time). The energy of a pulse is proportional to the square of the amplitude of the pulse. This means that the energy of the UWB pulse is increased by the above described processing.

Figure 5:
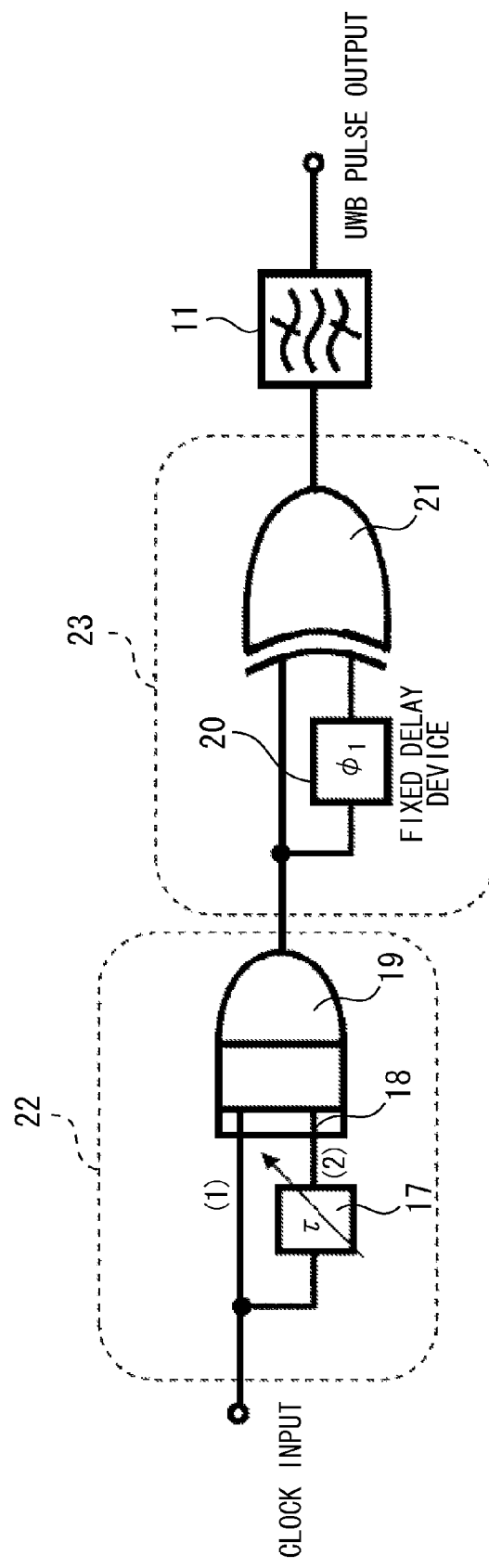
FIG. 5 is a figure showing a configuration example of the pulse generator according to the embodiment of the present invention.
Figure 6:
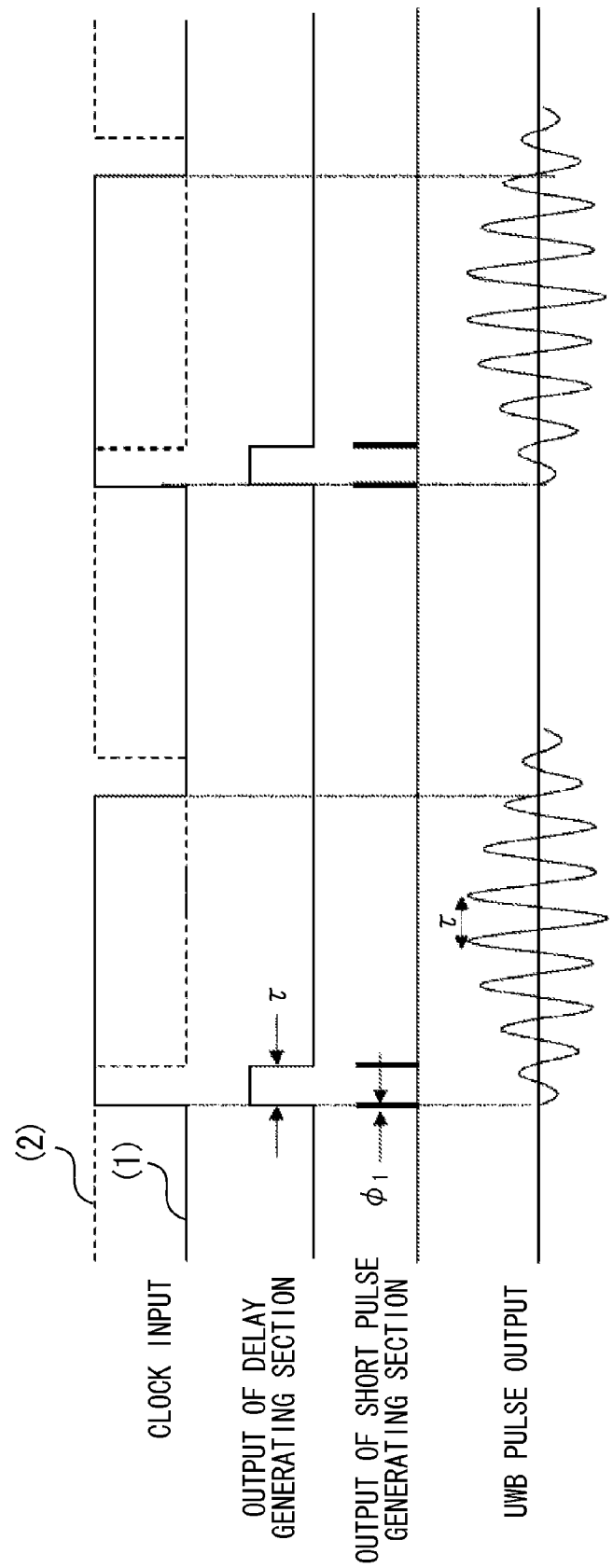
FIG. 6 is a figure showing an example of an operation of the pulse generator according to the embodiment of the present invention.

FIGS. 5 and 6 are figures showing a configuration and an operation of a pulse generator according to an embodiment of the present invention (an example in which two pulses are used).

The pulse generator according to the present embodiment includes a short pulse generating section 23 and a delay generating section 22, as shown in FIG. 5. As shown in FIG. 6, when a rectangular clock signal (1) is inputted to the delay generating section 22, a rectangular pulse having a pulse width τ=1/fc is outputted by a variable delay device 17 for delaying a signal by a time period equal to the reciprocal of center frequency of a UWB band, a logic inverter 18, and a logical product (AND) circuit 19. That is, the original clock input signal (1) and the clock signal (2) formed by making the original clock input signal pass through the variable delay device 17 and the logic inverter 18, are inputted into the logical product circuit 19, which thereby generates a pulse which becomes logical "1" only at the time when the clocks (1) and (2) are logical "1"s. The pulse is inputted into an exclusive logical sum (EXOR) circuit 21. At this time, a fixed delay device 20 for pulse generation having a delay amount φ1 is inserted in one of the inputs of the EXOR circuit 21. The fixed delay device 20 enables the EXOR circuit 21 to generate pulses at both the edges of the rectangular pulse generated by the delay generating section 22. The delay amount φ1 of the fixed delay device 20 becomes the width of the generated pulse. Here, by making the delay amount τ of the variable delay device 17 variable, it is possible to generate a pulse corresponding to various UWB bands (for example, 3 to 10 GHz, 24 to 29 GHz, and the like).

Figure 7:
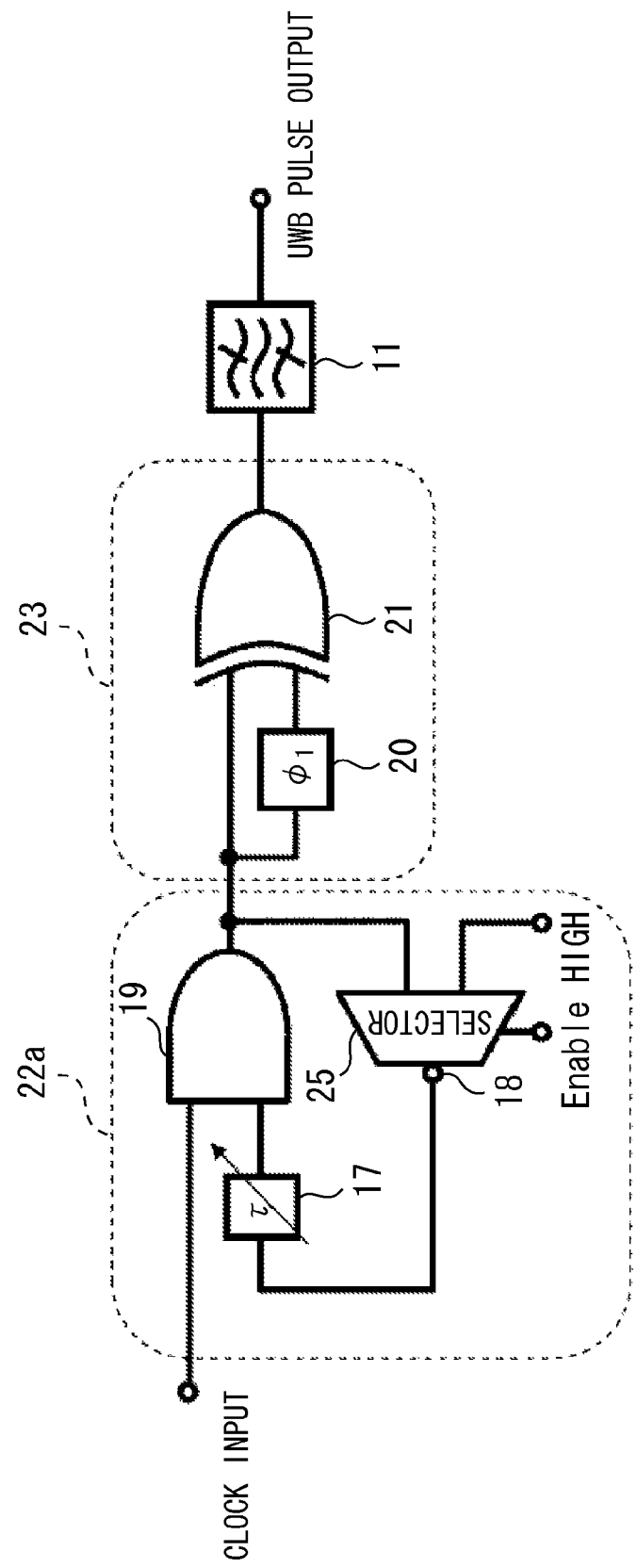
FIG. 7 is a figure explaining another aspect of the embodiment according to the present invention.
Figure 8:
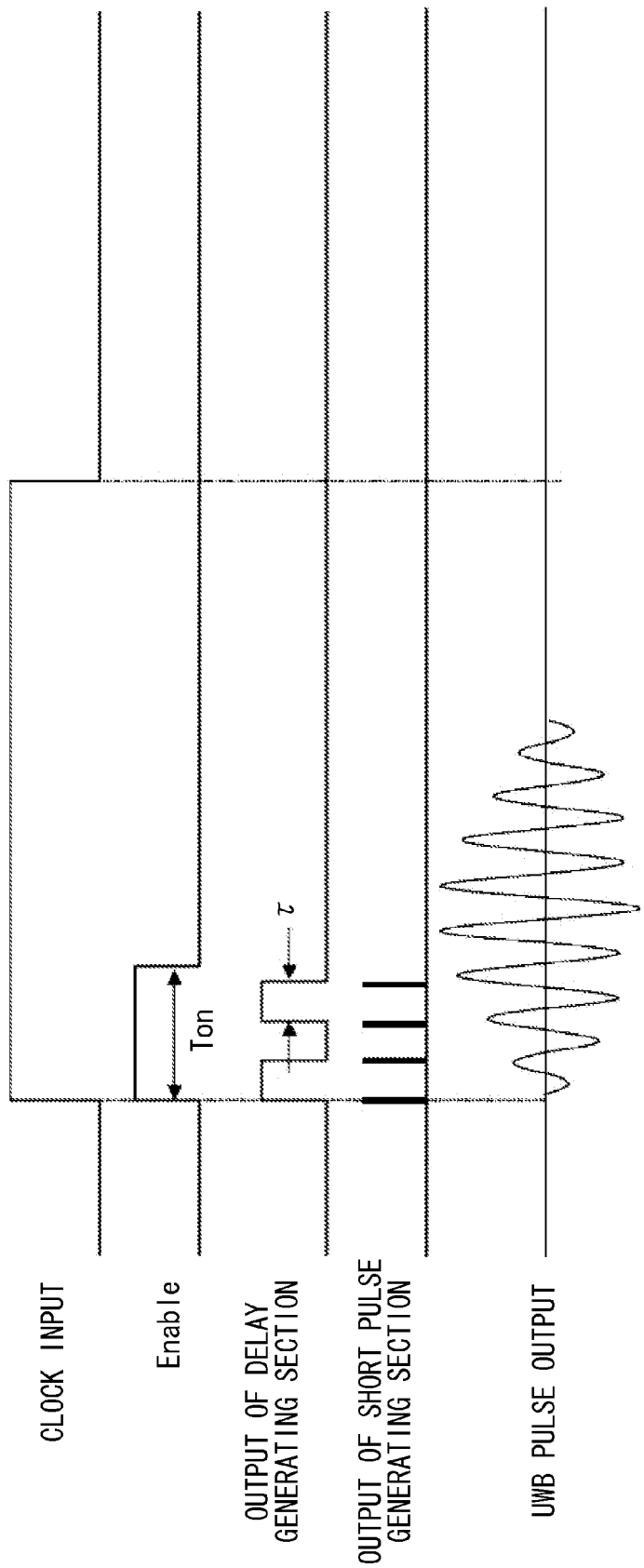
FIG. 8 is a figure showing an example of an operation of another aspect of the embodiment according to the present invention.

FIGS. 7 and 8 are figures explaining an aspect of the present embodiment in the case where N pulses (N is an arbitrary natural number) are generated.

The short pulse generating section 23 has the same configuration as the above described circuit, and hence the explanation thereof is omitted. A selector circuit 25 is newly inserted in a delay generating section 22a. As shown in FIG. 8, an "Enable" signal is inputted into the selector circuit 25, so that a rectangular pulse (having a pulse width of Ton) corresponding to a delay by the variable delay device 17 is outputted only when the "Enable" signal is in the ON state. At this time, when the ON time Ton of the Enable signal satisfies the following formula (1), k rectangular pulses are outputted. Further, the k pulses are inputted into the short pulse generating section 23 in the subsequent stage.

$$2(k-1) < Ton < 2k (k=1,2,3 \ldots : integer) \quad (1)$$

That is, when the Enable signal is OFF, the selector circuit 25 selects a terminal of logical HIGH. Then, the logic inverter 18 is provided in the output of the selector circuit 25, and hence the signal inputted into the logical product circuit 19 via the variable delay device 17 is set to LOW, and thereby the output of the logical product circuit 19 is also set to LOW. When the Enable signal is set to ON, the selector circuit 25 selects the output of the logical product circuit 19. At this time, the output of the logical product circuit 19 is set to LOW. Thus, the logic of the output is inverted by the logic inverter 18, so that HIGH is inputted into the logical product circuit 19. Thereby, the output of the logical product circuit 19 is set to HIGH. When the output of the logical product circuit 19 is set to HIGH, the logic of the output is inverted by the logic inverter 18, and is delayed by a time period τ by the variable delay device 17, so as to be inputted into the logical product circuit 19. Therefore, the output of the logical product circuit 19 is set to LOW after the time period τ. The above described operations are continued as long as the selector circuit 25 continuously selects the output of the logical product circuit 19. That is, the square wave having the pulse width τ is repeatedly generated. Then, the short pulse generating section (EXOR type) 23 generates pulses at the rising and falling edges of the input pulses. Thus, 2k pulses are outputted for the k rectangular pulses.

Figure 9:
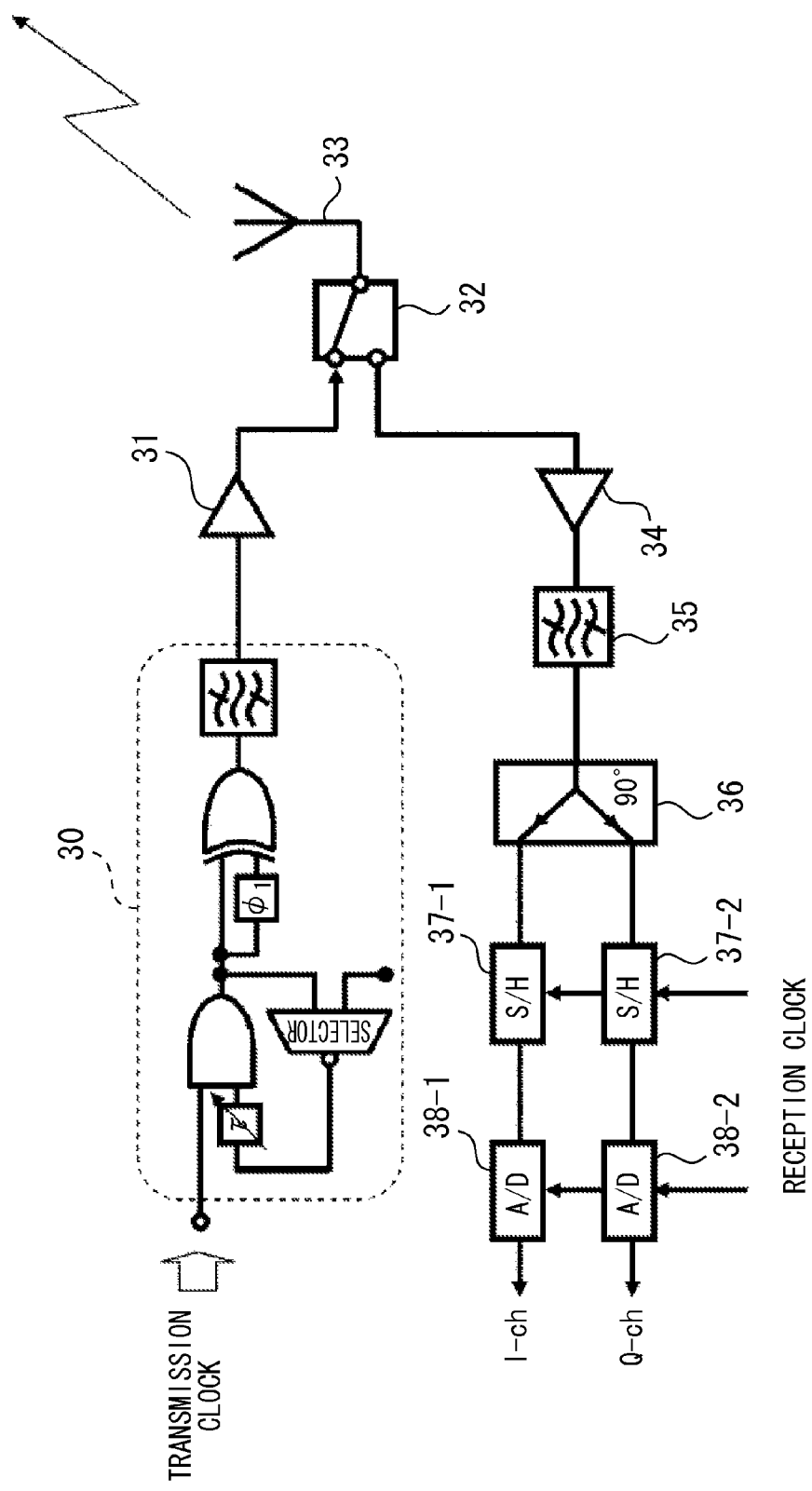
FIG. 9 is a figure showing a configuration example of a transmitter-receiver including the pulse generator according to the embodiment of the present invention.

FIG. 9 is a block diagram of a UWB pulse transmitter-receiver using a short pulse generator 30 according to the embodiment of the present invention. The UWB pulse transmitter-receiver is used in a radar system, or the like.

The short pulse generator 30 is the device as described in conjunction with the above embodiment. In FIG. 9, there is described a configuration in which N pulses are synthesized to generate a UWB pulse, but the short pulse generator 30 may also be configured such that only two pulses are synthesized to generate the UWB pulse. The pulse generated by the short pulse generator 30 is amplified by an amplifier 31, and is then transmitted from an antenna 33 via a switch 32. A signal received by the antenna 33 is inputted into an amplifier via the switch 32. The reception signal is amplified by the amplifier 34 and is then made to pass through a band pass filter 35. In a splitter 36, a signal of the I channel and a signal of the Q channel are separated from the reception signal. Then, the signals of the respective channels are sampled by sample hold circuits 37-1 and 37-2, and are converted into digital signals by A/D converters 38-1 and 38-2, so as to be transferred to a signal processing section (not shown) in the subsequent stage. The sample hold circuits 37-1 and 37-2, and the A/D converters 38-1 and 38-2 are operated according to a reception clock.

Note that the pulse generator according to the present embodiment can be used in the radar system and also in a communication device, and the like, which generally uses pulses.

In the present embodiment, there is no increase in the power source voltage and no power increase due to the addition of an amplifier. However, the "delay generating section" for generating a pulse train is newly required, and hence the power is consumed in this portion. The portion that mainly consumes the power in the UWB pulse generator is the "pulse generating section" for which high-speed characteristics are most required in the UWB pulse generator. The portion which consumes the most power after the "pulse generating section" is the logical product circuit in the delay generating section. However, the rectangular pulse of the delay output has a large pulse width and a narrow frequency band compared to the pulse in the subsequent stage. Here, when a ratio of the power consumption of the AND circuit in the delay generating section and the power consumption of the EXOR circuit in the pulse generating section is assumed to be a ratio of 1:2, the power consumption of the pulse generator according to the present embodiment becomes 3/2=1.5 times the power consumption in the conventional configuration (including only the pulse generating section). On the other hand, the output amplitude is doubled by using two pulses in the present embodiment. The effect is represented by the amplitude amplification rate/power consumption increase rate=2/1.5=about 1.4. On the other hand, when the amplitude of the pulse is doubled by an amplifier in the conventional technique, the power consumption of the amplifier is also doubled, and hence the amplitude amplification rate/power consumption increase is 2/2=1. Thus, the amplitude amplification rate/power consumption increase rate is larger in the present embodiment than in the conventional technique, and hence the present embodiment is more efficient than the conventional technique.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A pulse generator comprising:
a filter that limits a band of an input signal; and
a pulse generator that generates a plurality of pulses which are sequentially delayed one after another by a time period ($\tau$) equal to a reciprocal of a center frequency of the band of the filter, and inputting the plurality of pulses to the filter, wherein the pulse generator includes:
a logical product circuit that takes a logical product of either:
a clock signal and a signal formed by delaying the clock signal by the time period ($\tau$) and by inverting the logic of the delayed clock signal, or
a clock signal and a signal formed by inverting an output of the logical product circuit and by delaying the inverted output by the time period ($\tau$); and
an exclusive logical sum circuit that takes an exclusive logical sum of an output of the logical product circuit and a signal formed by delaying the output of the logical product circuit by a given time period.

2. The pulse generator according to claim 1, wherein the filter is a band pass filter.

3. The pulse generator according to claim 1, wherein the filter outputs an Ultra Wide Band pulse.

4. A radar system including the pulse generator according to claim 1.

5. A communication system including the pulse generator according to claim 1.

6. The impulse generator according to claim 1, wherein the impulse generator includes:
a logical product circuit that takes a logical product of a clock signal and a signal formed by inverting an output of the logical product circuit and by delaying the inverted output by the second interval; and
an exclusive logical sum circuit that takes an exclusive logical sum of the output of the logical product circuit and a signal formed by delaying the output of the logical product circuit by a given time period.

7. The impulse generator according to claim 1, wherein the filter is a band pass filter.

8. The impulse generator according to claim 1, wherein the filter outputs an Ultra Wide Band impulse increased by synthesizing the first impulse and the second impulse.

9. A radar system including the impulse generator according to claim 1.

10. A communication system including the impulse generator according to claim 1.

11. A pulse transmitter-receiver comprising:
a transmitter including a filter that limits a band of an input signal, and
a pulse generator that generates a plurality of pulses which are sequentially delayed one after another by a time period ($\tau$) substantially equal to a reciprocal of the center frequency of the band of the filter, and inputting the plurality of pulses to the filter; and
a receiver receiving a signal from the outside, wherein the pulse generator includes:
a logical product circuit taking a logical product of either:
a clock signal and a signal formed by delaying the clock signal by the time period ($\tau$) and by inverting the logic of the delayed clock signal, or
a clock signal and a signal formed by inverting an output of the logical product circuit and by delaying the inverted output signal by the time period ($\tau$); and
an exclusive logical sum circuit taking an exclusive logical sum of an output of the logical product circuit and a signal formed by delaying the output of the logical product circuit by a given time period.

12. The pulse transmitter-receiver according to claim 11, further comprising:
a first amplifier connected to the pulse generator.

13. The pulse transmitter-receiver according to claim 12, further comprising:
an antenna that transmits an output of the first amplifier to the outside, receiving the signal from the outside, and inputting the signal to the receiver.

14. The pulse transmitter-receiver according to claim 13, further comprising:
a switch that connects the antenna to one of the transmitter and the receiver.

15. The pulse transmitter-receiver according to claim 11, wherein the receiver further includes a second amplifier amplifying the signal.

16. The pulse transmitter-receiver according to claim 11, wherein the filter is a band pass filter.

17. A pulse generation method comprising:
generating a plurality of pulses which are sequentially delayed one after another by a time period ($\tau$) substantially equal to a reciprocal of the center frequency of transmission band of a filter which limits a band of an input signal; and
inputting the plurality of pulses to the filter, wherein
the plurality of pulses are generated by generating a first output by taking a logical product of a clock signal and a signal formed by delaying the clock signal by the time period ($\tau$) and by inverting the logic of the delayed clock signal, and generating a second output by taking an exclusive logical sum of the first output and a signal formed by delaying the first output by a given time period, or wherein
the plurality of pulses are generated by generating a first output by taking a logical product of a clock signal and a signal formed by inverting the first output and by delaying the signal by the time period ($\tau$), and by generating a second output by taking an exclusive logical sum of the first output and a signal formed by delaying the first output by a given time period.

18. The pulse generation method according to claim 17, wherein the filter is a band pass filter.

19. The pulse generation method according to claim 17, further comprising:
amplifying an output signal of the filter.

20. An impulse generator, comprising:
an impulse generator that generates at least a first impulse and a second impulse belonging to an ultra wide band ("UWB"), a first reciprocal of an interval between the first impulse and the second impulse being a frequency in an UWB; and
a filter that has a center frequency of a pass band and limits a band of the first impulse and the second impulse to output an UWB impulse having a plurality of waveforms corresponding to each of the first impulse and the second impulse, a second interval of each of the waveforms being a reciprocal of the center frequency of the filter;
wherein the impulse generator includes,
a logical product circuit that takes a logical product of a clock signal and a signal formed by delaying the clock signal by the second interval and by inverting the logic of the delayed clock signal; and
an exclusive logical sum circuit that takes an exclusive logical sum of an output of the logical product circuit and a signal formed by delaying the output of the logical product circuit by a given time period.

21. The impulse generator according to claim 20, wherein the first interval is equal to the second interval.

22. An impulse transmitter-receiver, comprising:
a transmitter including:
an impulse generator that generates at least a first impulse and a second impulse belonging to an ultra wide band ("UWB"), a reciprocal of a first interval between the first impulse and the second impulse being a frequency in an UWB; and
a filter that has a center frequency of a pass band and limits a band of the first impulse and the second impulse to output an UWB impulse having a plurality of waveforms corresponding to each of the first impulse and the second impulse, a second interval of each of the waveforms being a reciprocal of the center frequency of the filter; and
a receiver to receive a signal input from the outside;
wherein the impulse generator includes:
a logical product circuit that takes a logical product of a clock signal and a signal formed by delaying the clock signal by the second interval and by inverting the logic of the delayed clock signal; and
an exclusive logical sum circuit that takes an exclusive logical sum of an output of the logical product circuit and a signal formed by delaying the output of the logical product circuit by a given time period.

23. The impulse transmitter-receiver according to claim 22, further comprising:
a first amplifier connected to the impulse generator.

24. The impulse transmitter-receiver according to claim 23, further comprising:
an antenna that transmits an output of the first amplifier to the outside, receives the signal from the outside, and inputs the signal to the receiver.

25. The impulse transmitter-receiver according to claim 24, further comprising:
a switch that connects the antenna to one of the transmitter and the receiver.

26. The impulse transmitter-receiver according to claim 22, wherein
the receiver further includes a second amplifier amplifying the signal.

27. The impulse transmitter-receiver according to claim 22, wherein the filter is a band pass filter.

28. The impulse generator according to claim 22, wherein the first interval is equal to the second interval.

29. An impulse transmitter-receiver, comprising:
a transmitter including:
an impulse generator that generates at least a first impulse and a second impulse belonging to an ultra wide band ("UWB"), a reciprocal of a first interval between the first impulse and the second impulse being a frequency in an UWB; and
a filter that has a center frequency of a pass band and limits a band of the first impulse and the second impulse to output an UWB impulse having a plurality of waveforms corresponding to each of the first impulse and the second impulse, a second interval of each of the waveforms being a reciprocal of the center frequency of the filter; and
a receiver to receive a signal input from the outside;
wherein the impulse generator includes:
a logical product circuit that takes a logical product of a clock signal and a signal formed by inverting an output of the logical product circuit and by delaying the inverted output signal by the second interval; and
an exclusive logical sum circuit that takes an exclusive logical sum of an output of the logical product circuit and a signal formed by delaying the output of the logical product circuit by a given time period.

30. An impulse generation method, comprising:
generating at least a first impulse and a second impulse belonging to an ultra wide band ("UWB"), a first reciprocal of an interval between the first impulse and the second impulse being a frequency in an UWB; and limiting, by a filter, a band of the first impulse and the second impulse to output an UWB impulse having a plurality of waveforms corresponding to each of the first impulse and the second impulse, the filter having a center frequency of a pass band, a second interval of each of the waveforms being a reciprocal of the center frequency of the filter;

wherein the plurality of impulses are generated by generating a first output by taking a logical product of a clock signal and a signal formed by delaying the clock signal by the second interval and by inverting the logic of the delayed clock signal, and generating a second output by taking an exclusive logical sum of the first output and a signal formed by delaying the first output by a given time period.

31. The impulse generation method according to claim 30, wherein the filter is a band pass filter.

32. The impulse generation method according to claim 30, further comprising:

amplifying an output signal of the filter.

33. The impulse generation method according to claim 30, wherein the first interval is equal to the second interval.

34. An impulse generation method, comprising:

generating at least a first impulse and a second impulse belonging to an ultra wide band ("UWB"), a first reciprocal of an interval between the first impulse and the second impulse being a frequency in an UWB; and limiting, by a filter, a band of the first impulse and the second impulse to output an UWB impulse having a plurality of waveforms corresponding to each of the first impulse and the second impulse, the filter having a center frequency of a pass band, a second interval of each of the waveforms being a reciprocal of the center frequency of the filter;

wherein the plurality of impulses are generated by generating a first output by taking a logical product of a clock signal and a signal formed by inverting the first output and by delaying the signal by the second interval, and by generating a second output by taking an exclusive logical sum of the first output and a signal formed by delaying the first output by a given time period.

* * * * *